Figure 1:
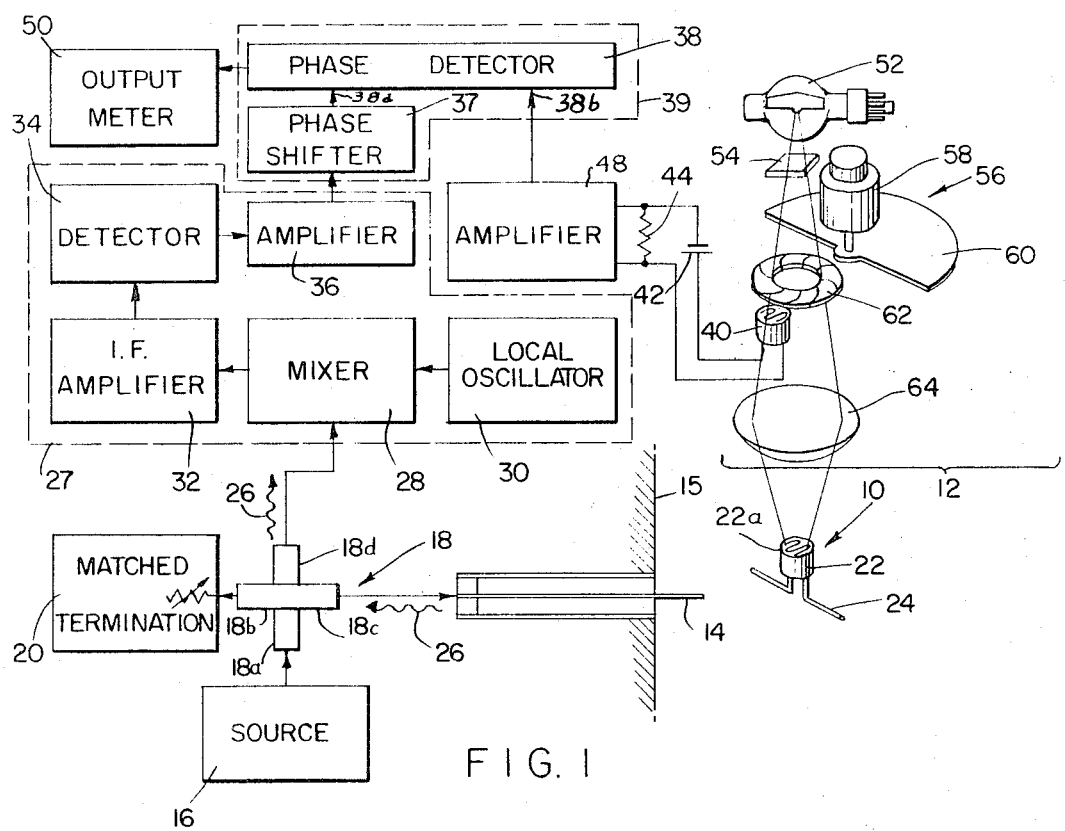

INVENTOR.
KEIGO IIZUKA
BY
Blair & Buckles
ATTORNEYS

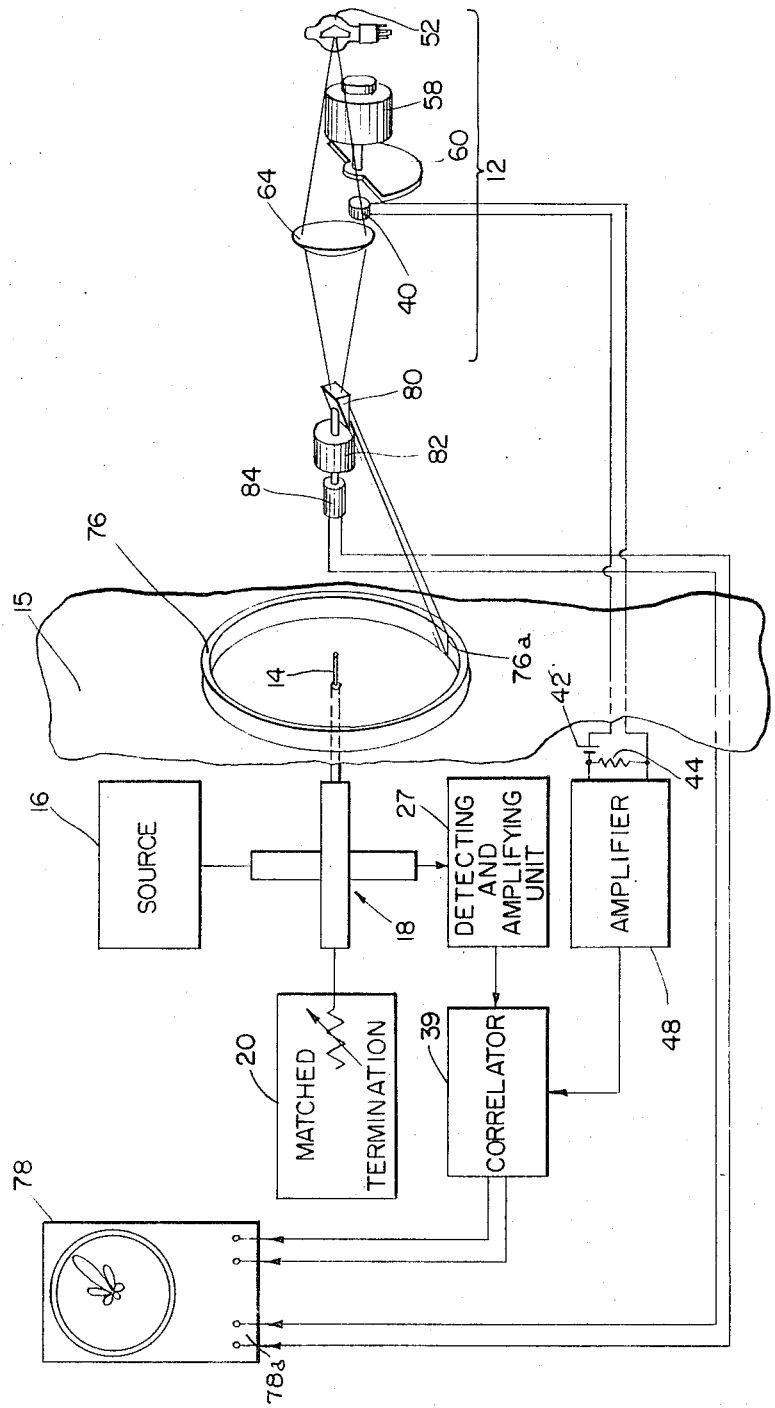

United States Patent Office 3,300,722
Patented Jan. 24, 1967

3,300,722
METHOD AND APPARATUS FOR MEASURING ELECTROMAGNETIC ENERGY WITH PHOTOSENSITIVE REFLECTORS
Keigo Iizuka, Somerville, Mass. (% Gordon McKay Laboratory, 9 Oxford St., Cambridge, Mass. 02138)
Filed June 18, 1963, Ser. No. 288,723
14 Claims. (Cl. 325—67)

This invention relates to remotely controllable photosensitive energy reflectors and to a method and apparatus for measuring electromagnetic energy by means of such reflectors. More particularly, the invention relates to antennas controlled with light of varying intensity so as to reradiate received radio frequency energy with amplitude modulation corresponding to the variation in the controlling light. The reflectors and measuring techniques used therewith are particularly useful in measuring field patterns of antennas. In these and other uses, the novel reflectors eliminate the mechanical and electrical control connections required between prior art reflectors and the associated signal processing apparatus. As discussed in detail below, elimination of such connections increases the accuracy with which the antenna patterns can be measured.

The spatial pattern of the electromagnetic energy that an antenna radiates or receives is often measured by exciting the antenna from a radio frequency source and sensing the radiated energy that is reflected from a reflector. To facilitate separating the reflected energy from the radiated energy, a control mechanism controls the reflector to modulate the energy it reradiates.

Prior controlled reflectors for such pattern measurements require mechanical or electrical connections with the control mechanism. For example, in a prior reflector in which the varying impedance of a diode modulates the reradiated energy, wires connect the diode with the control mechanism. The presence of such connections between the reflector and the control mechanism disturbs the pattern being measured and thus causes the measured radiation pattern to differ from the antenna's actual pattern.

Accordingly, it is an object of the present invention to provide a controllable reflector that introduces minimum disturbance into its ambient electromagnetic field.

Another object of the invention is to provide a controllable radio frequency energy reflector that is remotely controllable without mechanical or electrical control connections.

A further object of the invention is to provide a reflector of the above character controllable over a relatively wide range to impart substantial modulation to the energy it reradiates.

Another object of the invention is to provide a method and apparatus for accurately measuring the intensity of electromagnetic energy by sensing reflections of the energy.

A still further object of the invention is to provide for measurement of an antenna pattern with minimum introduction of pattern disturbance, so as to achieve high measuring accuracy.

It is a further object of the invention to provide a method and apparatus of the above character for measuring near fields associated with an antenna. The near fields of an antenna are those associated with the energy stored in the antenna. Such near fields generally differ from the radiation fields the antenna produces.

A further object of the invention is to provide a method and apparatus for simplifying the measurement of antenna patterns at different points throughout the pattern and for enhancing the accuracy and efficiency of such measurements.

Other objects of the invention will in part be obvious and will in part appear hereinafter.

The invention accordingly comprises the several steps and the relation of one or more of such steps with respect to each of the others and the apparatus embodying features of construction, combinations of elements and arrangement of parts which are adapted to effect such steps, all as exemplified in the following detailed disclosure, and the scope of the invention will be indicated in the claims.

Figure 2:
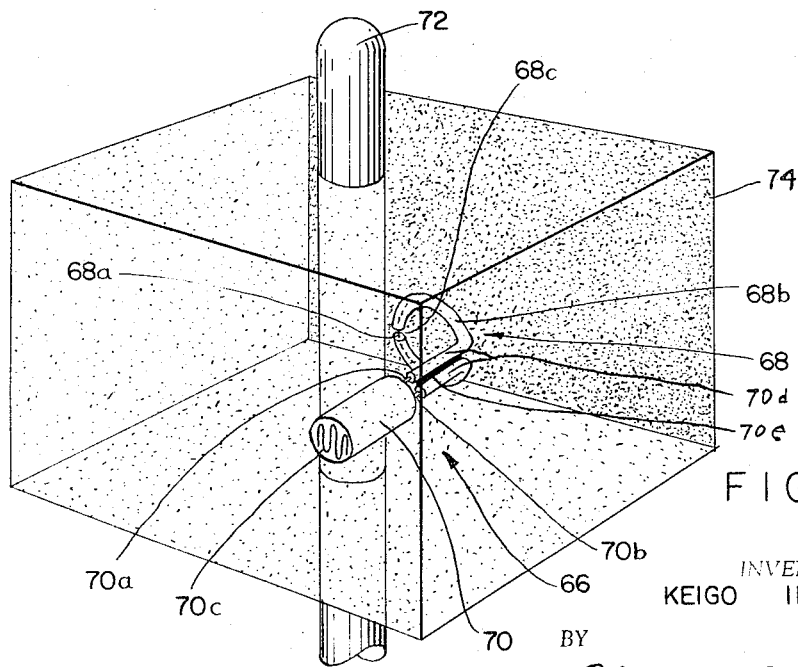

For a fuller understanding of the nature and objects of the invention, reference should be had to the following detailed description taken in connection with the accompanying drawings, in which FIG. 1 is a schematic representation of equipment for measuring electric fields with a controllable reflector according to the invention;

FIG. 2 is a simplified representation of apparatus for measuring the current distribution of an antenna; and FIG. 3 is a schematic representation of another embodiment of the invention.

In general, the controllable reflectors of the present invention utilize photosensitive material illuminated with modulated light to modulate the energy the reflectors reradiate. One such reflector uses a photoconductive detector, the impedance of which decreases in response to an increase in the intensity of the light incident on it. The change in impedance changes the reflectivity of the reflector. It should be noted that the photoconductive detectors referred to herein do not operate as demodulators, which are sometimes termed detectors. The term detector refers to their lightsensitive characteristics.

More particularly, the photoconductive detector is connected to the terminals of an antenna. When the antenna is placed in a field of radio frequency energy, it reradiates or reflects the energy, the reflected energy being modulated according to the modulation of its controlling light. The average amplitude of the reradiated energy corresponds to the intensity of the radio frequency field. The modulated reradiated energy is readily sensed and processed to provide a measure of the intensity of this radio frequency energy incident on the reflector. A probe of this type constructed with a dipole antenna reradiates energy in response principally to the electric field of the incident radio frequency energy.

Another reflector has a loop antenna connected with the photoconductive detector. The loop antenna reradiates energy primarily in response to the magnetic field linked by the loop. Accordingly, such a reflector can advantageously be used to measure magnetic fields, and thus the current distribution along an antenna. As discussed in detail below, the loop is preferably shielded to minimize its response to electric fields.

In another embodiment of the invention, the controllable reflector is a photosensitive surface extending over the region in which it is desired to measure the antenna pattern. A beam of light scans across the surface, illuminating a small region at one time to cause the surface to reflect principally from the illuminated region. In this manner, the entire antenna pattern is measured without moving the antenna or the signal processing system that receives and detects the reradiated energy.

FIG. 1 shows a reflector indicated generally at 10 controlled by modulated light from a lamp indicated generally at 12. The reflector is positioned in the field of an antenna 14.

A source 16 delivers a radio frequency signal, suitably continuous wave, to the first port 18a of a hybrid junction 18 having second and fourth ports 18b and 18c connected respectively to a matched termination 20 and the antenna 14. Accordingly, the antenna 14 receives half the power from the source 16.

The reflector 10, constructed with a photoconductive detector 22 and a dipole antenna 24, intercepts energy that the antenna 14 radiates. The reflector 10 reradiates (or reflects) the intercepted energy according to the intensity of the light it receives from the lamp 12. The antenna 14, in turn, intercepts the reradiated energy from the dipole antenna 24 and delivers a return signal, indicated with the undulating arrow 26, to the fourth port 18d of the hybrid junction 18.

A mixer 28, in a detecting and amplifying unit 27, receives both the return signal from the hybrid junction 18 and a local oscillator signal from a local oscillator 30. In response, the mixer 28 delivers to an intermediate frequency amplifier 32 and intermediate frequency signal varying in amplitude according to the modulation of the reradiated signal from the antenna 24. A detector 34 receives the amplified intermediate frequency signal and delivers to an amplifier 36 a detected signal whose frequency is the modulation frequency.

A correlator 39, having a variable phase shifter 37 and a phase detector 38, receives the amplified signal from the amplifier 36, and thus, after passing through the phase shifter 37, the detected reradiated signal is applied to a signal terminal 38a of the phase detector.

As also shown in FIG. 1, the lamp 12 illuminates a reference photoconductive detector 40 with the modulated light. The reference detector 40 is connected in series with a battery 42 and a resistor 44 to develop a varying reference voltage, corresponding to the light modulation, across the resistor 44. An amplifier 48 amplifies the reference voltage and delivers it to a reference terminal 38b of the phase detector 38.

The output of the phase detector 38, which is responsive only to the reradiated signal, as discussed below, is delivered to an output instrument such as a meter 50. The response of the meter 50 to the signal from the phase detector 38 indicates the intensity of the energy that the dipole antenna 24 intercepts. More specifically, it can be shown that the output from the correlator 39 is proportional to the square of the field intensity incident on the dipole antenna 24.

Thus, by moving the reflector 10 throughout the field of view of the antenna 14, the pattern of this antenna is readily measured. The reflector 10 introduces minimum disturbance to the pattern, since no control connections are made to it.

The modulation of the reflector 10 by the lamp 12 is preferably maintained uniform as the reflector is positioned at different points. This can be achieved by moving the lamp 12 with the reflector to maintain uniform spacing between the lamp and the detector 22. Alternatively, the lamp may be arranged to saturate the detector.

Considering the system of FIG. 1 in greater detail, the dipole antenna 24 of the reflector 10 is suitably constructed according to conventional techniques to operate as a small test probe and is connected to the terminals of the photoconductive detector 22. A suitable photoconductive detector is of cadmium selenide. The photosensitive surface 22a of the detector 22 intercepts the light from the lamp 12.

The lamp 12, also shown in detail in FIG. 1, comprises a light source 52 preferably radiating at a frequency at which the photoconductive detectors 22 and 40 have a high response. A zirconium arc lamp, as shown, is suitable for use with cadmium selenide detectors. A heat filter 54 is preferably disposed in the beam radiated by the source 52 to block infrared energy from the detector 22. A modulator 56, comprising a motor 58 rotating an opaque shutter 60 to intermittently interrupt the light beam, imposes a pulse modulation on the light controlling the reflector 10. An adjustable aperture 62 controls the light flux on the photoconductive detector 22 and a lens 64 focuses the light for substantially uniform illumination over the detector's surface 22a.

Assume that during operation of the system shown in FIG. 1, the antenna 14 receives a continuous wave radio frequency signal from the source 16 and in response radiates a continuous pattern of electromagnetic energy. Accordingly, the dipole antenna 24 of the reflector 10 intercepts a portion of the radiated energy, the intensity of which depends on the position of the reflector 10 in the field of the antenna 14.

The rotating shutter 60 cyclically turns off and on the light from the lamp 12 incident on the reflector 10. It has been found that a thirty cycle per second rate is suitable for this pulse modulation of the controlling light. As is well known for photoconductive detectors, their resistance decreases according to the intensity of the light incident on them. Accordingly, the detector 22 presents a pulse-modulated impedance across the terminals of the dipole antenna 24.

The reflectivity of the antenna 24 is a function of the impedance across its terminals, and thus, in response to the varying impedance, the antenna 24 reradiates energy that is pulse-modulated. The average intensity of the reradiated energy corresponds to the intensity of the energy incident on the antenna 24. More specifically, the dipole antenna 24 is particularly sensitive to the electric field of the energy radiated by the antenna 14 and hence the average reradiated power is a measure of the electric field strength.

The pulse modulation of the reradiated signal from the antenna 14 distinguishes the reradiated signal from other, unwanted signals present in the measuring system. Such unwanted signals stem, for example, from 60 cycle per second pickup, radio frequency leakage from the source 16 and noise. Filter networks in the detector 34 and the amplifier 36 can eliminate the unwanted signals whose frequencies differ from the 30 cycle per second modulation frequency of the reradiated signal.

The correlator 39 provides further rejection of unwanted signals, to enhance the accuracy of the measurement. In response to the reflected signal is receives at its terminal 38a and the reference signal it receives at its terminal 38b, the phase detector develops a D.-C. output whose magnitude is a maximum when the two signals are in phase. Inputs to the terminal 38a differing in frequency from the reference signal produce A.-C. outputs which are readily separated from the D.-C. signal. Moreover, the relative phase of undesired inputs will vary, again with a resultant A.-C. output. Thus, once the variable phase shifter 37 is adjusted to equalize the phases of the reflected and reference signals at the input of the phase detector, the phase shifter 37 and phase detector 38 operate as a correlator, responsive almost exclusively to the reflected signal.

FIG. 2 shows another embodiment of the invention wherein a reflector indicated generally at 66 has a loop antenna 68 connected to a photoconductive detector 70 to reradiate electromagnetic energy responsive primarily to the magnetic flux linked by the loop antenna 68. The photoconductive detector 70 presents a varying impedance across its terminals 70a and 70b in response to modulated light directed to its surface 70c. A conductive loop 68a is connected between the detector terminals 70a and 70b and is shaped to link magnetic flux. Thus, the magnetic flux passing through the conductive loop 68a induces therein a current proportional to the total linked flux. When pulse-modulated light illuminates the surface 70c of the photoconductive detector, the loop 68a reradiates energy proportional to the linked flux and pulse-modulated according to the modulation of the controlling light.

A shield 68b coaxially covers the loop 68a except at a gap 68c where the loop 68a is unshielded. The gap 68c is preferably symmetrically positioned along the loop 68a with respect to its connections to the detector 70. That is, the gap 68c is disposed along the loop 68a midway between the connections to the detector terminals. The shield leg portions 70d are electrically connected together at 70e so as to be at the same radio frequency potential. With this arrangement, the shield 68b minimizes the response of the loop antenna 68 to electric fields.

More specifically, the electric field parallel to the line between the center of the loop and the gap 68c produces substantially no net voltage across the gap. However, components of electric field transverse to the gap (that is, parallel to a line across the gap) induce opposite voltages on each edge of the gap and hence produce a net voltage across the gap. However, inasmuch as this voltage is proportional to the width of the gap, it is relatively negligible when the gap is small.

As is also shown in FIG. 2, the antenna 68 can also be used for measuring the current distribution along an antenna 72. For this measurement, the reflector 66 is suitably supported in a block 74 of dielectric material having a dielectric constant as close to that of free space as practical; high density "polyfoam" is suitable for this purpose. The block 74 suitably extends substantially uniformly about the antenna 72, which slideably passes through a hole in the block. With this arrangement, the block 74 securely supports the reflector 66 at a fixed distance from the antenna 72 and oriented with the gap 68c closest to the antenna.

A modulated light source suitably similar to the lamp 12 in FIG. 1 is then arranged to illuminate the detector's surface 70c as the block 74 is moved along the antenna 72. The block-supported antenna 68 and the antenna 72 are suitably connected with measuring equipment such as that shown in FIG. 1 to measure the current distribution along the antenna 72.

FIG. 3 shows an antenna pattern measuring and displaying system using a photoconductive reflector 76 disposed about the antenna 14, which extends beyond a ground plane 15. The antenna 14 is connected with a measuring system, such as that of FIG. 1, comprising a source 16 delivering radio frequency to a hybrid junction 18 having a pair of ports connected respectively with the antenna 14 and with a matched termination 20. The antenna 14 intercepts the reradiated energy from the reflector 76 and delivers a resulting signal to the hybrid junction 18 which in turn couples it to the detecting and amplifying unit 27. The output of the unit 27 is delivered to the correlator 39.

With further reference to FIG. 3, the reference photoconductive detector 40 is connected with a battery 42 and resistor 44 to deliver to the amplifier 48 a reference signal modulated according to the light modulation controlling the reflector 76. The output of the correlator 39 is fed to a cathode ray display 78, similar to a conventional plan position indicator.

The modulated light from the lamp 12 illuminates the reference photoconductive detector 40 and a light deflector 80, such as a prism or mirror, carried on the shaft of a motor 82. The deflector 80 directs the modulated light to a narrow strip 76a on the photoconductive reflector 76. The illuminated strip 76a has markedly less impedance than the remainder of the reflector 76 and hence reradiates substantially more energy than the remainder of the reflector. Accordingly, the reradiated energy returned to the antenna 14 comes principally from the illuminated strip 76a and indicates the strength of the field pattern at the strip. The motor 82 rotates the light deflector 80 to sweep the strip 76a around the inner photosensitive surface of the reflector 76. In this manner, the antenna 14 receives reradiated energy providing a continuous indication of its pattern over a full 360° each time the light deflector 80 completes one full rotation. The cathode ray display 78 conveniently presents a polar plot of the output signal from the correlator 39, thereby displaying the complete pattern of the antenna 14. The sweep of the display 78 is synchronized with the rotation of the light deflector 80 by means of a synchro generator 84 whose shaft rotates with the shaft of the motor 82 and whose stator windings are connected to the sweep input 78a of the cathode ray display.

In the foregoing preferred embodiments, the reflectors have photoconductive detecting means. However, it has also been found that photovoltaic elements undergo a change in internal impedance in response to intensity modulated light. Hence, such photosensitive elements can also be used in remotely controllable reflectors of the invention.

In summary, I have described several embodiments of remotely controllable reflectors comprising photosensitive elements that modulate the radio frequency energy reradiated by the reflectors according to the variations in intensity of control light incident upon the photosensitive elements. The reradiated energy has a substantial modulation index. For example, one such reflector using a cadmium selenide photoconductive detector has a modulation index of 1.2.

The reflectors make possible the measurement of electromagnetic field intensities and distributions with high accuracy by eliminating control connections to the reflector. In fact, measurements of antenna radiation patterns, near field patterns and the current distribution along an antenna produce results that are in close agreement with theoretical determinations and with the best measurements made with more elaborate prior techniques.

It will thus be seen that the objects set forth above, among those made apparent from the preceding description, are efficiently attained, and since certain changes may be made in carrying out the above method and in the constructions set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Having described the invention, what is claimed as new and secured by Letters Patent is:

1. A method for measuring radio frequency energy comprising the steps of
   (a) intercepting said energy with a reflector of radio frequency energy that has a photosensitive surface extending along at least a first direction and is exposed to said radio frequency energy,
   (b) illuminating said reflector surface with intensity modulated optical energy that illuminates at one time only a portion of said surface along said first direction and that moves along said surface in said first direction to illuminate successively disposed portions at successive times,
   (c) intercepting the radio frequency energy reradiated from said reflector surface, and
   (d) producing an output indication in response to the intercepted reradiated energy.

2. The method defined in claim 1
   (a) in which said step of intercepting said reradiated energy produces a first signal corresponding to the amplitude of said reradiated energy,
   (b) comprising the further step of producing a second signal corresponding to the intensity modulation of said optical energy,
   (c) comprising the further step of producing a third signal corresponding to the portion of said reflector surface being illuminated with said optical energy as a function of time, and
   (d) wherein said output indication-producing step comprises
      (1) combining the said first and second signals to produce an indication of the amplitude of said radio frequency energy incident on said reflector surface, (2) combining said indication and said third signal to identify the portion of said reflector surface from which the reradiated energy stems.

3. Apparatus for measuring the spatial pattern of radiated radio frequency energy, said apparatus comprising
(a) a photosensitive element elongated in at least a first direction and reradiating radio frequency energy incident thereon in accordance with the intensity of optical energy incident on it,
(b) a source of modulated optical energy illuminating different portions of said photosensitive element along said first direction at different times,
(c) an antenna element for intercepting radio frequency energy said photosensitive element reradiates, and
(d) output means
(1) connected with said antenna element and producing an output indication of the radio frequency energy incident on said photosensitive element, and
(2) receiving from said optical source a signal corresponding to the movement of said optical energy relative to said photosensitive element and indicating the position thereon from which said intercepted radio frequency energy stems.

4. In apparatus for measuring radiate electromagnetic energy by sensing reflections of said radiated energy, the combination of
(a) remotely controllable reflector for producing said reflections, said reflector comprising
(1) photosensitive means having a pair of terminal conductors and developing between said conductors an electrical impedance that varies according to the intensity of optical energy incident thereon, and
(2) antenna means comprising
(i) a magnetic field-responsive conductive loop connected between said terminal conductors, and
(ii) a shield enclosing said loop and having a loop-exposing gap symmetrical on said loop between said terminal conductors, and
(b) means directing amplitude modulated optical energy onto said photosensitive means.

5. In apparatus for measuring radiated radio frequency energy by sensing reflections of said energy, the combination of
(a) a remotely controllable reflector for producing said reflections, said reflector comprising
(1) photosensitive means having an electrical impedance that varies according to the intensity of optical energy incident thereon, and
(2) antenna means in circuit with said impedance of said photosensitive means,
(b) means directing amplitude modulated optical energy onto said photosensitive means, and
(c) dielectric means supporting said antenna means at a selected position relative to the source of said radio frequency energy.

6. Apparatus for measuring radiant radio frequency energy, said apparatus comprising
(a) a remotely controllable photosensitive reflector for disposition in the field of said radio frequency energy, said reflector comprising
(1) a photosensitive element and
(2) an antenna element connected with said photosensitive element and arranged to reradiate incident radio frequency energy with varying amplitude according to the intensity of the optical energy incident on said photosensitive element,
(b) an optical source for directing intensity-modulated optical energy onto said photosensitive element,
(c) means for intercepting radio frequency energy said antenna element reradiates,
(d) reference means producing a reference signal corresponding to the intensity modulation of the optical energy said source directs on said photosensitive element, and
(e) correlating means connected with said reference means to receive said reference signal and with said intercepting means to receive a reradiated signal corresponding to the radio frequency energy said antenna element reradiates,
(1) said correlating means developing an output signal substantially free from amplitude variations due to the modulation of the optical energy incident on said photosensitive element.

7. Apparatus for measuring radio frequency energy comprising in combination
(a) an antenna radiating radio frequency energy;
(b) a remotely controllable reflector disposed in the field of said antenna and comprising first photosensitive means responsive to intensity-modulated light incident thereon;
(1) said first photosensitive means amplitude modulating, in accordance with the modulation of the incident light, the energy said reflector reradiates;
(c) a lamp directing intensity-modulated light onto said first photosensitive means;
(d) reference photosensitive means producing a reference signal whose amplitude varies according to the intensity of the light from said lamp;
(e) means intercepting the energy said reflector reradiates and developing a reradiated signal in response thereto;
(f) correlation means comprising a phase shifter and a phase detector;
(1) said correlation means receiving said reference signal and said reradiated signal and
(2) applying them in phase with each other to said phase detector; and
(g) output means receiving the output signal from said phase detector and producing in response thereto an output indication which is a measure of the amplitude of said reradiated signal.

8. The apparatus defined in claim 7 in which
(a) said first photosensitive means comprises a first photoconductive detector having a light-receiving surface and a pair of terminals,
(1) said first detector developing an electrical impedance between said terminals responsive to the light intensity incident on said surface,
(b) said reflector comprises also a second antenna connected with said first detector terminals, and
(c) said reference photosensitive means comprises a second photoconductive detector illuminated by said lamp.

9. The apparatus defined in claim 7 in which
(a) said first photosensitive means of said reflector forms a surface extending along the field of view of said antenna; and
(b) said lamp sweeps said light along said surface illuminating at one time only a portion thereof so that said reflector reradiates energy principally from said illuminated portion.

10. The combination defined in claim 9 in which
(a) said photosensitive surface is of a photoconductive material, and
(b) said output means is synchronized with said lamp and indicates the position along said surface from which said output indication stems.

11. A method for measuring radio frequency electromagnetic energy comprising the steps of
(a) intercepting said energy with a remotely controllable photosensitive reflector of radio frequency energy,
(b) illuminating said reflector with intensity modulated light, (c) modulating the radio frequency impedance of said reflector in accordance with the modulation of said light, whereby said reflector reradiates radio frequency energy responsive to said intercepted energy and amplitude-modulated according to the modulation of said light, and (d) producing an output indication corresponding to the amplitude of said reradiated energy.

12. The method defined in claim 11

(a) further comprising the step of producing a reference signal corresponding to the intensity modulation of said light illuminating said reflector, and (b) in which said output indication producing step comprises combining the reradiated signal with said reference signal to produce an output indication essentially free of variations due to the intensity modulation of said light illuminating said reflector.

13. A method for measuring radio frequency energy produced by an antenna, said method comprising the steps of (a) intercepting said energy with reflecting antenna means, (b) directing intensity-modulated light onto photoconductive means in circuit with said antenna means, (c) modulating the impedance of said reflecting antenna means with said photoconductive means in response to the intensity modulation of said light, (d) reradiating intercepted energy from said antenna means with amplitude modulation corresponding to the intensity modulation of said light, (e) intercepting said reradiated energy and producing a corresponding reradiated signal, (f) applying said reradiated signal and a reference signal corresponding to the intensity modulation of said light in phase with each other to a phase detector.

14. Apparatus for measuring radiant radio frequency energy said apparatus comprising (a) a remotely controllable photosensitive reflector for disposition in the field of said radio frequency energy, said reflector comprising (1) a photosensitive element and (2) an antenna element connected with said photosensitive element and arranged to reradiate incident radio frequency energy with varying amplitude according to the intensity of the optical energy incident on said photosensitive element, (b) an optical source for directing intensity-modulated optical energy onto said photosensitive element, (c) means for intercepting radio frequency energy said antenna element reradiates and producing a first signal in response thereto, (d) means for producing a second signal corresponding to said modulation of said optical energy, and (e) output means receiving said first and second signals and producing in response thereto an output signal corresponding to the intensity of the radio frequency energy incident on said antenna element.

References Cited by the Examiner

UNITED STATES PATENTS

| | | | |
|---|---|---|---|
| 1,122,594 | 12/1914 | Harrison | 325—27 |
| 2,047,930 | 7/1936 | Linder | 325—140 |
| 2,206,072 | 7/1940 | Barthelemy | 250—200 X |
| 2,587,156 | 2/1952 | Havenhill et al. | 324—72 |
| 2,633,525 | 3/1953 | Wells | 325—67 |
| 2,978,652 | 4/1961 | Thomas | 332—54 |
| 3,040,262 | 6/1962 | Pearson | 330—7 |

DAVID G. REDINBAUGH, *Primary Examiner.*

B. V. SAFOUREK, *Assistant Examiner.*